US008200634B2

(12) United States Patent
Driesen et al.

(10) Patent No.: US 8,200,634 B2
(45) Date of Patent: Jun. 12, 2012

(54) ZERO DOWNTIME MAINTENANCE USING A MIRROR APPROACH

(75) Inventors: Volker Driesen, Friedenstrasse (DE); Thomas Brodkorb, Paradeisstr (DE); Roy Abitbol, Kfar-Netter (IL); Miki Ben-Zeev, Redmond, WA (US); Franklin Herbas, Palo Alto, CA (US)

(73) Assignee: SAP AG, Walldorf (DE)

( * ) Notice: Subject to any disclaimer, the term of this patent is extended or adjusted under 35 U.S.C. 154(b) by 599 days.

(21) Appl. No.: 12/247,978

(22) Filed: Oct. 8, 2008

(65) Prior Publication Data
US 2010/0088281 A1 Apr. 8, 2010

(51) Int. Cl.
G06F 7/00 (2006.01)
G06F 17/00 (2006.01)
(52) U.S. Cl. ............ 707/641; 707/610; 711/113; 714/11
(58) Field of Classification Search ........................ None
See application file for complete search history.

(56) References Cited

U.S. PATENT DOCUMENTS

| | | | |
|---|---|---|---|
| 6,691,245 B1 * | 2/2004 | DeKoning | 714/6.31 |
| 7,155,462 B1 | 12/2006 | Singh et al. | |
| 7,933,866 B2 * | 4/2011 | Blair et al. | 707/610 |
| 2002/0049925 A1 * | 4/2002 | Galipeau et al. | 714/6 |
| 2002/0120791 A1 * | 8/2002 | Somalwar et al. | 709/330 |
| 2003/0130985 A1 | 7/2003 | Driesen et al. | |
| 2003/0131278 A1 * | 7/2003 | Fujibayashi | 714/6 |
| 2005/0114291 A1 * | 5/2005 | Becker-Szendy et al. | 707/1 |
| 2006/0047718 A1 * | 3/2006 | Keith et al. | 707/204 |
| 2007/0271414 A1 * | 11/2007 | Nakatani et al. | 711/113 |
| 2008/0195750 A1 * | 8/2008 | Sadovsky et al. | 709/234 |
| 2009/0182600 A1 * | 7/2009 | Lungu | 705/7 |

FOREIGN PATENT DOCUMENTS
EP 1091305 4/2001

OTHER PUBLICATIONS
European Search Report dated Oct. 19, 2009, issued in connection with counterpart European Application No. 09007840.3-2211.

* cited by examiner

Primary Examiner — Khanh Pham
Assistant Examiner — Azam Cheema
(74) Attorney, Agent, or Firm — Mintz, Levin, Cohn, Ferris, Glovsky & Popeo, P.C.

(57) ABSTRACT

The subject matter disclosed herein provides methods and apparatus, including computer program products, for providing software updates. In one aspect there is provided a method. The method may include copying an application to a shadow system, the application used to upgrade the shadow system rather than a production system; copying data from the production system to the shadow system; selecting whether to lock changes to data in the production system or record changes to the data in the production system; recording one or more changes to data in the production system, the changes recorded in a container, when record changes has been selected; migrating recorded data in the container to the shadow system, so that the shadow system and production system are in a similar data state; and using the shadow system, upgraded with the application and at least one of data copied from the production system and recorded data from the container, for production rather than the production system. Related systems, apparatus, methods, and/or articles are also described.

18 Claims, 3 Drawing Sheets

ZERO DOWNTIME MAINTENANCE USING A MIRROR APPROACH

FIELD

This disclosure relates generally to data processing and, more particularly, to reducing downtime associated with maintaining software.

BACKGROUND

Databases are often used to facilitate the running of software applications running on a processor, such as a computer, blade, and the like. Examples of software applications include operating system software, and programs that run on an operating system. Databases in computing environments also store data. Moreover, the stored data may be used to configure programs and application data generated during production (i.e., a productive or operational use) of the application.

Various arrangements may be provided to facilitate access to a database. For example, networked and other database sharing environments permit multiple users to share a database. Such arrangements facilitate client-server solutions for business and other types of database user environments. By way of example, R/3 is a client-server solution provided by SAP AG. An R/3 system typically includes a number of software applications or modules that are installed in an environment comprising a database and an application server connected to the database. The application server of an R/3 system can perform numerous functions, including executing programs stored in the database.

Databases often need to be upgraded in view of various factors. For example, modifications or enhancements to applications and/or data by a software vendor may require that prior releases running on a database be upgraded to a new release. Additionally, revisions to correct programming errors or bugs may require that a database be upgraded with a new release.

When upgrading a database, there are a number of technical problems to be addressed. For example, most database users depend on the availability of a database, including the applications and data stored therein. In some cases, the required availability of a database may dictate that interruptions to productive operation be minimized when performing an upgrade. By way of example, a database user may require approximately, continuous availability of a database (e.g., availability 12-24 hours a day, 5-7 days a week). Therefore, extended database interruptions may be unacceptable and minimizing the downtime for a database upgrade can become problematic, especially when attempting to upgrade a large database using conventional techniques.

Other issues may exist when upgrading a database. For instance, many database environments require that certain modifications, add-ons, support packages, application data, customizing data, and/or other items be maintained when installing a new release. Making adjustments to import or maintain such items can dramatically extend the downtime required for performing an upgrade and, in some cases, create failure or disaster risks for the database. Conventional methods for upgrading a database also suffer other drawbacks, such as being technology dependent or restrictive as to the upgrade release (i.e., dependent on the prior release(s) installed in the database).

SUMMARY

The subject matter disclosed herein provides methods and apparatus, including computer program products, for providing software updates and, in particular, reducing downtime associated with those updates.

In one aspect there is provided a method. The method may include copying an application to a shadow system, the application used to upgrade the shadow system rather than a production system; copying data from the production system to the shadow system; selecting whether to lock changes to data in the production system or record changes to the data in the production system; recording one or more changes to data in the production system, the changes recorded in a container, when record changes has been selected; migrating recorded data in the container to the shadow system, so that the shadow system and production system are in a substantially similar data state; and using the shadow system, upgraded with the application and at least one of data copied from the production system and recorded data from the container, for production rather than the production system.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1:
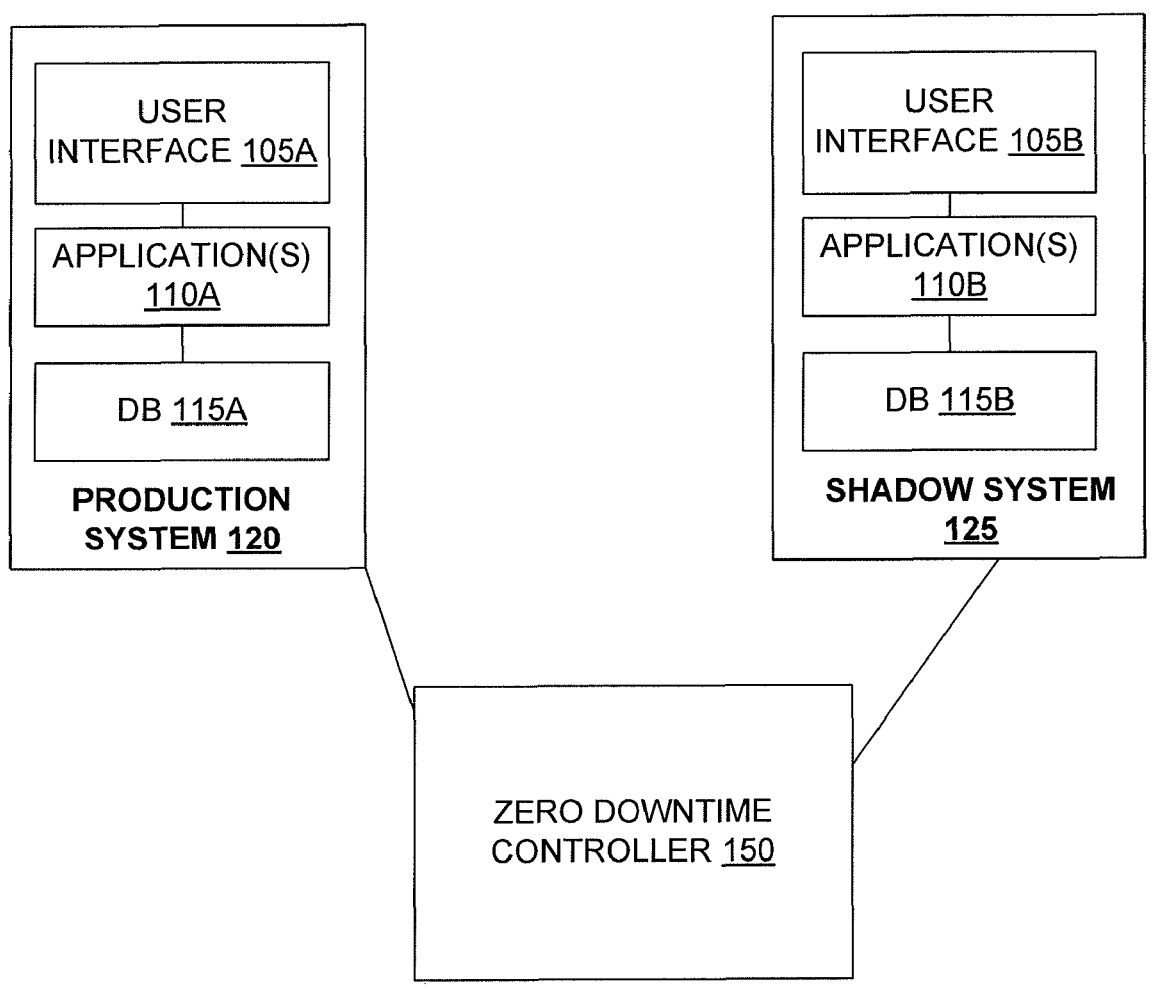
FIG. 1 illustrates a system 100 including a zero downtime controller 150.

The subject matter described herein relates to reducing downtime due to maintenance activities. The phrase "zero downtime" refers to reducing the downtime associated with a maintenance activity, such as an upgrade of an application and/or an upgrade of data. Zero downtime refers to having a downtime that is perceived almost as zero by a user. For example, zero downtime maintenance be implemented, so that the user's production is not affected and, in some cases, the zero downtime maintenance takes less than about 10 minutes.

When an upgrade is applied to a complex enterprise software system, such as those commercially available from SAP, the maintenance procedure may require downtime, during which time the system is not available for its intended use (e.g., for production). The term upgrade refers to changes, replacements, modifications, and/or additions to production system 120 (which is described below with respect to FIG. 1). The upgrade may include providing another so-called "release" including one or more software program updates for production system 120 (which may be updates to a program, a component of a program, data associated with the program, and/or any other item, which may be included in a release). This time, during which the system is not available, represents a downtime, as well as a business downtime when the business is not productive. Although the system operates to implement the upgrade associated with the maintenance activity, the system is down from a business perspective since the system is in an inconsistent state and the required services cannot be provided by the system.

For example, if the system is an enterprise resource planning (ERP) system supporting manufacturing, the ERP system may incur downtime during a maintenance activity since the ERP system cannot support manufacturing operations. In this example, the downtime may represent a loss of manufacturing capacity and corresponding revenue. Similarly, a software-based system supporting Web commerce requires very high levels of availability since an outage may impact revenue.

As noted above, during a deployment of an upgrade, a system may be in an inconsistent state due to several reasons. One of those reasons is that the runtime environment of the system is updated during the upgrade associated with the maintenance activity. This runtime environment update induces downtime to services running in the runtime environment of the system. For example, if an operating system is updated, operating system processes cannot run. In the case of a database system, the runtime environment associated with a J2EE (Java 2 Platform Enterprise Edition) engine, application servers, and the like, cannot run during the update. Another reason that the system may be in an inconsistent state is that the application within a runtime environment may be updated. For example, the application software is replaced by an upgraded application (and in some cases data)—requiring that the previously running version of the application software be placed in an offline state during the upgrade. Another reason that the system may be in an inconsistent state is that the configuration of the application is updated to be consistent with the upgrade. Yet another reason that the system may be in an inconsistent state is that data may be adjusted to match the format required by the upgraded software application (e.g., migrating data into a new format, adjusting tables of a database, adjusting formats, and the like).

The downtime induced by maintenance activity can thus range from a few hours to days or even weeks. For customers using a system in a production environment, downtime clearly disrupts business. As such, systems used in production settings are often required to meet availability specifications. For example, a software-based system may be rated to provide customers with a required system availability of, for example, 99.9% or higher. In this example, the total downtime of a 99.9% available system is a maximum of 8 hours downtime per year. As such, any maintenance activities must be implemented to have the lowest possible downtime; otherwise, the required available of 99.9% may not be achieved. The subject matter described herein may thus be used to attain higher availability by providing zero downtime maintenance in connection with an upgrade.

FIG. 1 depicts a system 100 including a production system 120, a shadow system 125, and a zero downtime controller 150, all of which are coupled by a communication mechanism, such as the Internet, an intranet, and the like. When an upgrade (which includes applications and/or data) is implemented, the upgrade is first implemented in the shadow system 125, which is a copy of the production system 120. When the upgraded system is ready to be used, the shadow system 125 becomes a production system, and the production system 120 is no longer used to support production. The subject matter described herein relates to implementing the upgrade with zero (or substantially close to zero, e.g., about 10 minutes) downtime.

The production system 120 further includes a user interface 105A, one or more applications 110A, and a database 115A, all of which are coupled by a communication mechanism, such as an intranet or the Internet. User interface 105A may be implemented as any type of interface mechanism for a user, such as a Web browser, a client, a smart client, and any other presentation mechanism. In some implementations, the processes described herein with respect to zero downtime maintenance are applicable to those aspects of the user interface implemented and/or stored at the backend (e.g., the backend server). The one or more applications 110A may be implemented as any type of program, such as an application server. The application server refers to a program that handles operations between users (e.g., at a user interface) and backend business databases, such as database 115A. Database 115A (labeled "DB") may be implemented as any type of database.

The shadow system 125 (also referred to as a mirror system) further includes a user interface 105B, one or more applications 110B, and a database 115B, all of which are coupled by a communication mechanism, such as an intranet or the Internet. User interface 105B may be implemented as any type of interface mechanism for a user, such as a Web browser, a client, a smart client, and any other presentation mechanism. The one or more applications 110B may be implemented as any type of program, such as an application server. Database 115B (labeled "DB") may be implemented as any type of database. In some embodiments, shadow system 125 represents a copy of production system 120 (e.g., user interface 105B, one or more applications 110B, and database 115B are copied from production system 120). Thus, the maintenance activity, such as the upgrade, may be implemented on shadow system 125 rather than production system 120. Moreover, when the upgrade is complete, the shadow system 125 is placed online for production, and the production system 120 is no longer used for production.

The maintenance activity described herein relates to an upgrade of an aspect of the production system. As noted above, the upgrade may include changing, replacing, and/or adding an aspect of production system 120. For example, an upgrade may provide a new version (also referred to as a release) of one or more applications (or components thereof and/or provide data. The upgrade may provide data, such as configuration data, for use at production system 120 (e.g., at one or more of applications 110A, database 115A, and user interface 105A). Moreover, the upgrade may include a plurality of applications (or components of applications) and data, all of which may be implemented in a sequence to ensure proper installation of the upgrade.

To minimize the risk of a protracted downtime and to approach a zero downtime maintenance activity, the upgrade is implemented first at shadow system 125 by copying the production system 120 (including the database 115A) to the shadow system; migrating the programs and data to shadow system 125; and, when the migration is complete, switching production to the shadow system 120 (which has been upgraded). Moreover, during the migration, a locking mechanism may be used to lock any changes to data being migrated from the production system to the shadow system. Alternatively, changes to the data on the production system 120 may be recorded in a container, such that any changes, occurring during the data migration from the production system 120 to the shadow system, can be applied to the data at the shadow system 125. Regardless of whether a locking mechanism or a recording container mechanism is used, the shadow system 125 is upgraded and the data of the shadow system 125 has the same state as the data of the production system. The shadow system 125 is then placed online—used for production; while the production system 120 is placed offline (e.g., disconnected, disabled, and the like). More importantly, the upgrade is thus be performed with zero downtime.

Zero downtime controllers 150 may be implemented as one or more data processors, such as a server, computer, blade, and the like, and may include an interface, such as an application program interface, to enable control of the upgrade. In some embodiments, the zero downtime controller 150 may perform one or more of the following functions: copying an application to a shadow system (e.g., the application used to upgrade the shadow system); locking changes to data in the production system; recording changes to the data in the production system; copying data from the production system to the shadow system, when locking has been selected; recording one or more changes to data in the production system; recording changes to a container; generating a container; migrating recorded data in the container to the shadow system, so that the shadow system and production system are in a similar data state; controlling the use of the shadow system when upgraded with the application and at least one of data copied from the production system and recorded data from the container (e.g., switching production from the production system to the shadow system); and other functions described herein related to controlling and/or implementing a software upgrade to minimize downtime.

Figure 2:
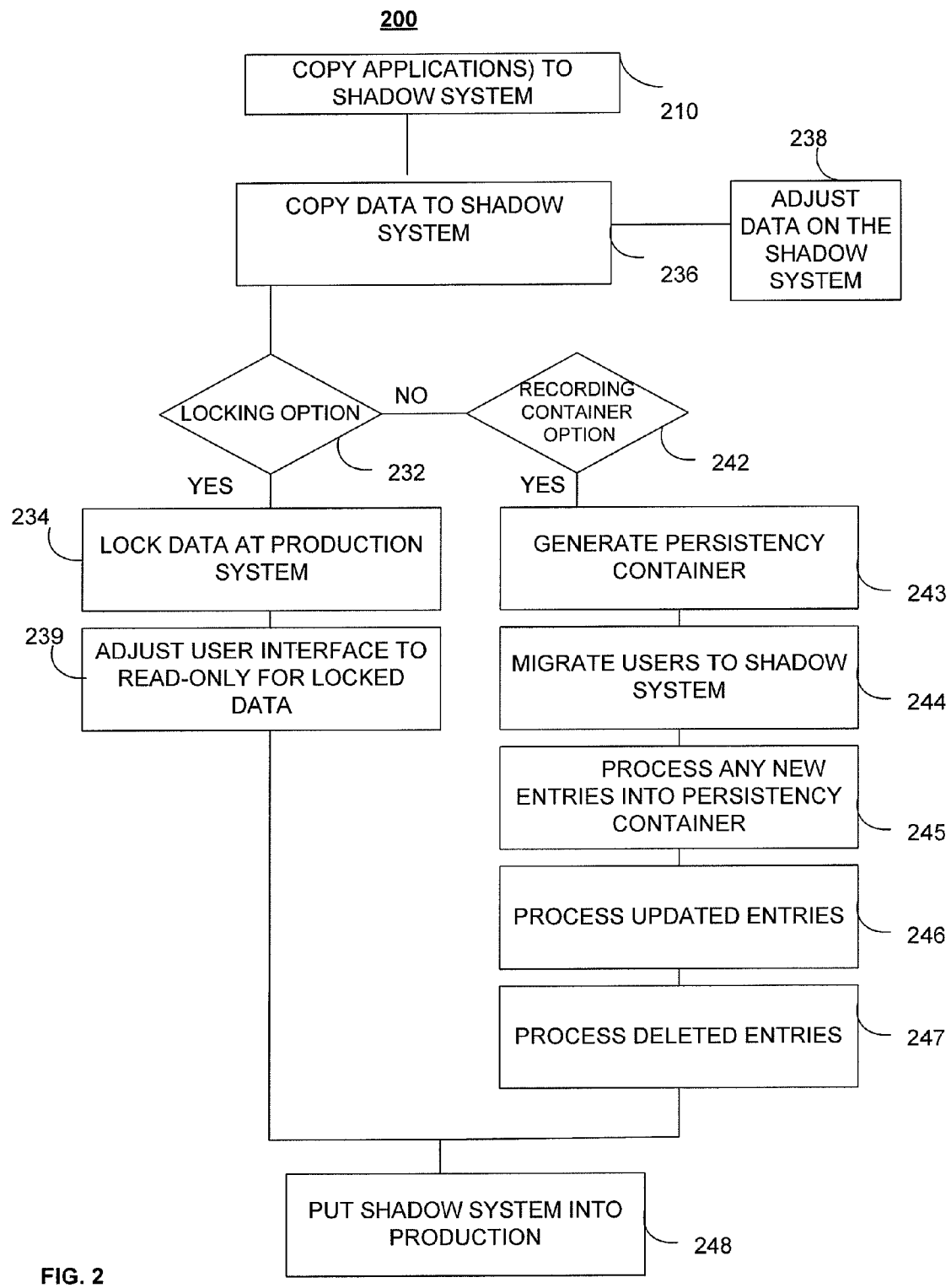
FIG. 2 illustrates a process 200 for implementing an upgrade, such as a new software release, using a zero downtime maintenance.

FIG. 2 depicts a process 200 for zero downtime maintenance. The description of process 200 will also refer to FIGS. 1 and 3.

At 210, applications, which are part of the upgrade, are copied to the shadow system 125. For example, if the upgrade consists of a new release of the operating system associated with application 110A, zero downtime controllers 150 may copy the new release of the operating system to shadow system 125. In some implementations, the release is configured as a maintenance package with one or more programs for the upgrade. Moreover, the maintenance package may be implemented as a database table, wherein entries of the table correspond to the new programs being used in the upgrade.

When 210 is performed, shadow system 110A includes a copy of the programs being upgraded (if not the entire system) from production system 120. For example, if the upgrade consists of a new release of the operating system associated with application 11A, zero downtime controller 150 may first copy application 110A (including its old operating system) to shadow system 125. Next, zero downtime controller 150 may copy the new operating system of the upgrade to shadow system 125 and then perform the upgrade to the old operating system at shadow system 125 (e.g., using the new operating system of the upgrade). Moreover, during copy at 210, any copied components may need to be adjusted (described below at 238) by zero downtime controller 150 to account for differences between systems 120 and 125 (e.g., hardware, network connections, bandwidth, storage, and the like).

At 236, data is copied to the shadow system 125. If the data is provided by the provider of the upgrade (e.g., the software vendor) rather than the production system 120, the data is copied to shadow system 125. If the data is located at the production system 120, zero downtime controller 150 copies the data from the production system 120 to the shadow system 125. When the zero downtime controller 150 performs a copy, the zero downtime controller 150 may perform the copy or initiate copying by another device, such as production system 120. Data may include configuration data related to the configuration of production system 120, production data (e.g., data associated with the users attached to the database 115A), data included in database 115A, and any other data associated with production system 120. In some embodiments, zero downtime controller 150 prompts a user at user interface 105A to select between the locking option 232 or the recording container option 242.

Examples of data categories being copied include primary business data, such as sales order, master data, account information, customer invoices, and the like. Other examples of data categories include business operation data (e.g., batch job runtime information, update task information, input queues, print queues, and the like), compliance relevant data (e.g., change log, user access to certain objects, monitoring and statistical data, and the like), and user data (e.g., user attributes, such as name, address, telephone, user account information, such as last login and password, user personalization data, and notes and/or comments attached to objects).

At 238, the data copied at 236 to shadow system 125 may be adjusted. For example, the configuration data copied to the production system 128 may have to be adjusted (or configured) to account for the environment of the shadow system 125. For example, the data may be reformatted, and table structures in the database may be configured for the release, and so forth. Moreover, the persistency may be adjusted completely (e.g., from storing complex data as an XML file to storing data in a relational database table on a single value basis, data entries of a database may be converted from inch to centimeters, objects of the database may be extended, a new status variable may be added, and the like). In some embodiments, additional configuration data is provided by a user (e.g., of production system 120) rather than a vendor of the upgrade.

When the data is copied from the production system 120 to the shadow system 125, a locking option may be implemented at 232. When this is the case, the data is locked at 234, so that any data persisted at the production system 120 cannot be changed. Examples of such changes include inserts, updates, deletes, and the like.

At 239, once the data is locked, the user interface (e.g., user interface 105A) is also configured to reflect the locked state of the data persisted at production system 120 (e.g., data persisted at database 115A). For example, the user interface may indicate that the data is locked and in a "read only" mode by presenting an indication (e.g., a message, pop-up, etc.) at the user interface that the data is "read-only" or, alternatively, an icon, field, or button at the user interface may be disabled (e.g., so that a user cannot change data at the user interface 105A and persist that change to the database 115A).

In some implementations, the locking at production system 120 prevents productive use, which causes a maintenance downtime. When this is the case, rather than locking at 234, data from production system 120 is still copied at 236 to shadow system 125 and then adjusted at 238. However, any changes to the data at the production system 120 are recorded, so that these changes can be applied to the data copied to the shadow system 125.

When the data is copied from the production system 120 to the shadow system 125, a recording container approach may be implemented rather than the locking option of 232 (no at 232 and 242). The recording container approach generally includes copying the data of the production system 120 to the shadow system 125; generating a container; and then recording in the container any changes to data persisted at the production system 120. These changes recorded (e.g., stored, included, etc.) in the container thus reflect changes to the data of the production system 120, which need to be applied to the data of the shadow system 125 to make the data at both the production and shadow systems consistent (e.g., have the same state). For example, the changes in the container can be replayed (e.g., applied to) the data persisted at shadow system 125 (which was previously copied at 236), so that the shadow system 125 has the same data as the original, production system. In short, the data persisted at production system 120 is copied at 236 to shadow system 125, changes to the data at production system 120 are recorded in the container, and those changes are subsequently replayed at the shadow system 125, so that the data at the shadow system 125 is in the same state as the data in the production system 120.

Figure 3:
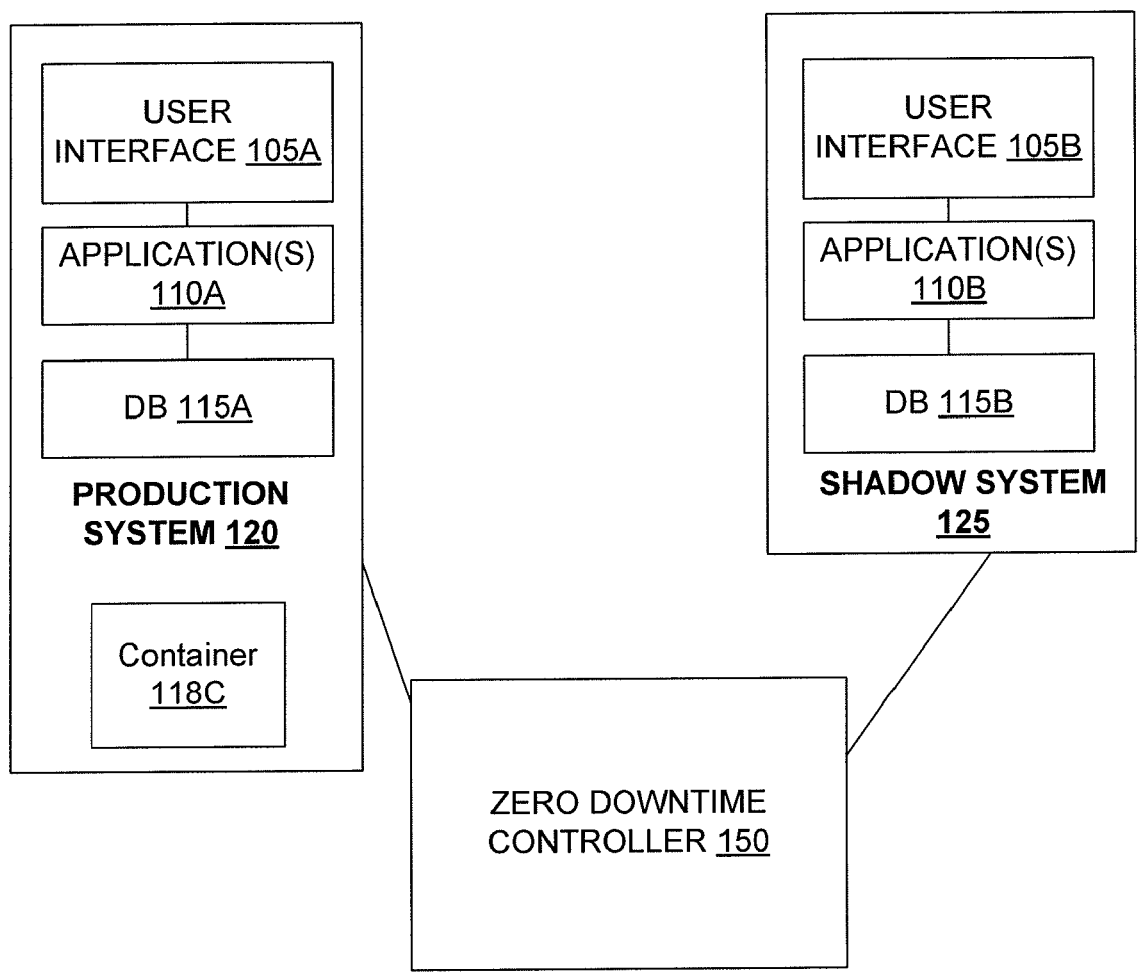
FIG. 3 illustrates the system 100 of FIG. 1 including a container.

At 243, a container is generated. When the application(s) and data are copied to the shadow system 125 at 210 and 236, the persistency container is generated by, for example, zero downtime controller 150, and that persistency container may be generated at the production system 125. FIG. 3 depicts an example of a persistency container 118C. The persistency container (also referred to as a container) may be implemented as a container for holding data that is persisted (e.g., in storage). Initially, the persistency container is empty (e.g., does not include any data). However, as changes are made to any data at production system 120, those changes are recorded, so that the changes can be migrated and thus replayed at (e.g., applied to) the data at shadow system 125. This migration and replay of changes places the shadow system 125 in the same state as the production system 120.

In some implementations, the container entries (which indicate changes to data at production system 120) are written within the same transaction as the primary data being migrated to the shadow system. As such, in the event of a rollback, the container is still consistent. The container may be implemented to store a sequence number to allow sorting the entries of the container according to when the change is inserted into the container. The sequence number may also be used to provide an "in order" transfer to or, replay at, shadow system 125. Moreover, the sequence number may also be used to implement an "exactly-once-in-order" mechanism during the transfer to or, replay at, shadow system 125. The contents of the container thus represent a recording, which can be replayed at shadow system 125 to make the data at shadow system 125 consistent (e.g., the same or similar to) the data at production system 120.

In one implementation, the container 118C is implemented as follows. For each database table at the production system 120, a second database table is created in the container 118C with the same key, an additional key field (which defines the sequence number), and a key field specifying the kind of change (e.g., whether the change is an insert, update, delete). The recordings (i.e., the changes included in the container 118C) may also be implemented as one table specifying the table name and the sequence number in the key field, a data field (which includes the data originally copied from the production system 120), and a key field specifying the kind of change (e.g., how that original data was changed). For some types of data, a sequence of "create" plus "delete" can be skipped from transfer (e.g., if it is ensured that no follow-up actions are triggered).

At 244, after the container is generated, users attached to production system 120 (e.g., clients accessing database 115A via user interface 105A and application 110A) are migrated to shadow system 125. For example, a user at user interface 105A is given a user identifier, password, and the like to allow that user to access database 115A and the like.

At 245, during the migration process, any new entries to data associated with production system 120 are written to the generated persistency container 118C at shadow system 125 and to the production system 120. The new entries in persistency container 118C serve as a recording of changes and thus may be subsequently migrated to (and replayed at) the persistency of shadow system 125 (e.g., to database 115C). The changes (also referred to as entries) in the persistency container may be used to fall back to the production system if there is a problem with the migration and/or maintenance activity.

At 246, during the migration process, any updates to entries to data associated with production system 120 are handled based on whether the data has been copied or migrated to shadow system 125. When data has not been migrated (e.g., copied) to shadow system 125, the data is read from the old persistency at, for example, database 115A, but then migrated to the newly, generated persistency container 118C. In some embodiments, the newly, generated persistency container 118C may have a new format, in which the data is read from the old persistency (e.g., database 115A), but then migrated to the newly, generated persistency container 118C in a new format. When the data is written to the newly, generated persistency container 118C, any required changes (which are due to the upgrade) are applied and the changed data set is stored in the newly, generated persistency container 118C. However, when data being updated has been migrated to the generated persistency container 118C, any updates are simply read from, and/or changed to, the newly generated persistency container 118C. The data in newly generated persistency container 118C serves as a recording of changes and thus may be subsequently migrated into the persistency of shadow system 125 (e.g., to database 115C).

At 247, during the migration process, any deletions to entries to data associated with production system 120 are handled based on whether the data has been migrated to shadow system 125. For example, when the deleted data is not yet migrated to shadow system 125, the entry (e.g., at database 115A) is marked as not to be migrated. On the other hand, when the data has been migrated to the generated persistency container 118C, the data entry is removed from the generated persistency container 118C. If the recording is not done on a low database level but on a semantic level in the application, a "create" plus "delete" transfer might be required to ensure the follow-up actions are triggered as well in the shadow system.

At 248, zero downtime controller 150 makes the shadow system 125 the production system, and disables (e.g., disconnects, deletes, and the like) production system 120. However, in some embodiments, the data in persistency container 118C, which serves as a recording of changes, is migrated into, and replayed at, the persistency of shadow system 125 (e.g., to database 115C) before placing the shadow system 125 in production with the upgraded application and/or data. The process 200 may repeat when another upgrade is available. When that is the case, shadow system 125, which is now in productive use, becomes the production system 120, and another shadow system is created for the upgrade process. The user requests to the system can be channeled through a dispatcher. This allows switching the logon request to the new system (e.g., the shadow system 125), which might reside on a different host or use different port numbers centrally.

The switch over can also be done on a "group-by-group" basis (e.g., first all users from a certain region can be switched, then the next region) or on an application type basis (e.g., first all users of application one, then all users of application two, and so forth). A friendly switch over can be realized, if a user is only logged off when the current transaction is finalized. In some cases, a grace period may be in place, after which open transactions are terminated. A session switch over might be used, where a user context in the application server is copied to the new system including the entered data. A "rolling switch over" might be used as well (e.g., during a rolling switch over users are logged off from the old system and allowed to logon to the new system independently of each other). For example, given two application servers connected to a database, one application server is shut down, and the other application server is connected to the new persistency (e.g., another database). The users can then logon to the second application server and work with the new persistency. Next, the application server connected to the old persistency is shut down and is connected to the new persistency.

While the above applications and data are being copied (or migrated) from the production system 120 to the shadow system 125, a so-called background (or parallel) process can run to migrate any remaining data from the production system 120 to the shadow system 125 (which ensures no data sets are migrated that have been marked as deleted and, as such, not-to-be-migrated).

Although the zero downtime maintenance process 200 may be used to migrate any application and data, in some implementations, the process 200 may be used to migrate database systems. Moreover, in some implementations, the process 200 may be used to provide zero downtime maintenance to complex software systems, such as database systems, ERP systems, CRM (customer relationship management) systems, and the like. These systems are commercially available from SAP AG. The following describes embodiments related to complex software systems, such as those commercially available from SAP AG.

The following describes an example implementation of process 200. In particular, the following describes process 200 implemented in an SAP-based system, although the following may be applicable to systems from other vendors as well.

A so-called "live" production system is placed into a maintenance mode. The maintenance mode may be characterized by one or more of the following attributes: all changes that an application stores in a database or a file server are recorded in a manner that they can be identified at a later stage; applications, which are not required in a read-write mode, are switched to a read-only mode; and applications that do not support read-only mode or change recording are stopped.

Moreover, in maintenance mode, the behavior of applications is changed in one of the following three different manners: change recording, read-only, and stopped. With change recording, all changes associated with applications stored in the database or file server are recorded in a container (e.g., container 118C) in a way that the changes can be replayed at a later point in time, and applications switching to the change recording mode can be used normally in maintenance mode. With read-only mode, applications, which are not required during the maintenance period, are changed to read-only mode. With regard to stopped, applications (which can neither enable change recording nor read-only mode) are stopped. In some implementations, the change recording mode is used as a default or preferred mode.

Next, a shadow system (also referred to a mirror system) is created. The shadow system is created during production, and represents a copy of the production system. The created (e.g., copied) shadow system includes all data stored in the file system and/or the database at the production system. Moreover, the system parameters of the shadow system (e.g., hostname and the like) may have to be adjusted.

The shadow system is started in a manner, where it is isolated from remote systems and is not available for user access. In some implementations, for the shadow system, it must be ensured that there are no business operations taking place. The business operations are initiated by end users, batch jobs, and, possibly, by other systems communicating with this system directly (e.g., B2B, Web services, remote function calls, and the like). Generally, enterprise systems are integrated into a landscape of systems. For example, a customer may have an ERP system and a Business Warehouse (BW) system, which extracts data from the ERP system to provide data analysis. In this example, it must be ensured that the remote system (e.g., the BW system) does not communicate with the shadow ERP system; otherwise the original and the shadow systems may both send data, which could cause conflicting communications. To avoid conflicting changes, the isolation may also configure the systems to avoid parallel business operation on the original, production system and on the shadow system; otherwise, conflicting changes cannot be readily resolved. The isolation may limit calls (e.g., no calls) to the remote systems. When such calls are required in the context of the maintenance procedure, the shadow system may have to be extended to the required remote system, although another option is to queue such calls until the system is switched to productive use.

The upgrade (e.g., a maintenance package, release, and the like) is then applied to the shadow system. As a part of this step, the upgrade is deployed to the shadow system updating any, old data (which might have been migrated from the production system). The configuration data may also be adjusted to accommodate the new software upgraded at the shadow system (e.g., shipped configurations, templates, and user provided data are used to adjust and/or configure the new structure of the upgraded shadow system). In addition, application data may also be adjusted to accommodate the new software upgraded at the shadow system. These adjustments may include extending new fields, using application specific programs, and/or transforming data.

Data in the live, production system (data that has been recorded in container 118C since the creation of the shadow system) is applied to the shadow system. In some cases, recording to container 118C (which are later transferred to and replay at shadow system 125) may continue (e.g., repeatedly) since even when the recording changes are being migrated to and replayed at the shadow system 125 other changes may be occurring, and thus being recorded at container 118C. Moreover, these other changes are referred to as data deltas. The data deltas can also be identified and read by, for example, the zero downtime maintenance controller 150, which transports data deltas to the shadow system 125, where those data deltas can be applied to the shadow system 125. Before applying data deltas from the live, production system 120 to shadow system 125, the data deltas are converted (by the zero downtime controller 150) to the format required by the upgrade of the shadow system 125. The process of recording data deltas at the production system 120 and applying the data deltas (which represent changes) to the shadow system 125 may be repeated until a sufficiently small amount of data deltas are recorded in container 118C but pending application at shadow system 125.

The transfer of data deltas may be implemented in so-called "chunks." As soon as the transfer is started, the recorded data deltas are gathered and a new chunk of data is recorded at container 118C. Then, the first chunk is transferred to shadow system 125. As soon as the first chunk has been transferred completely to shadow system 125, the second chunk is closed at container 117C and a third chunk is opened at container 118C, while the second chuck is being transferred to shadow system 125. This is repeated, until the chunks are sufficiently small. The chuck represents a portion of data. Alternatively, the transfer may be performed incrementally in the sequence in which it was recorded. For example, the data deltas which are recorded first are transferred first. Then, the transfer is continued until the remaining data deltas in the container 118C are below a threshold (which may be defined by the user or the vendor of the upgrade). Next, the production system 120 is locked for users, and the remaining data is transferred during the downtime.

After the recorded data changes applied to the shadow system 125, the live, production system is then taken then off-line from productive use (e.g., no active users, no batch processing, and no services that are called). Lastly, any data remaining in the production system 120 is applied (e.g., copied, replicated, and the like) to the shadow system 125. For example, when the volume contained in a table at container 118C is not large and/or is not growing, a record and replay process may be skipped in favor of a direct transfer of data from the production system to the shadow system as the small amount of data can be readily transferred.

Moreover, any remote connections to the system are changed to the shadow system. Remote connections include, for example, connections to other remote systems, such as an ERP system, a BW system, and the like. Communications with these remote systems are switched over to the shadow system as is the case with the switch of the users from the production system 120 to the shadow system. Moreover, the switch of the remote systems connections may be changed to have the shadow system 215 used the address (e.g., IP address) of the original production system 120, so that the remote systems can access the shadow system 125 with the same address as the live, production system 120 before the operation at 248. At this point, the shadow system 125 is thus ready for so-called "live" use (e.g., open for business use).

Although the subject matter described herein relates to providing zero downtime maintenance, which increases the availability of services or systems, the above-described processes may be used for other functions as well.

Zero downtime maintenance is considered a primary use for the subject matter described herein. The processes described herein may, however, be used for any kind of software maintenance package upgrade, although more useful for large and/or complex upgrades. With regard to zero downtime maintenance, the processes described herein can be used for upgrades, such as the deployment of support packages and support package stacks. Specifically, a support package (SP) updates one complete software component; while a SP stack, updates all (used) components in a system. Moreover, in the case of a deployment of a new software product version, the new product version can contain new features and incompatible changes that can have global impact on a system and a system landscape. The subject matter described herein may also be used for online data migration.

The subject matter described herein may also be used for configuration changes. For example, during a change of configuration, an inconsistent intermediate state can occur. Depending on the duration and impact of the configuration inconsistency, business downtime may occur. Using the shadow system process 200 described herein, downtime may be minimized, if not avoided. For example, the original, production system is made available during the configuration changes. On the shadow system, the configuration changes can be changed, and once the system is in a consistent state, the users can be switched to the shadowy system.

The subject matter described herein may also be used for system migration to different hardware platform, operating system (OS), or database (DB) type. For example, in SAP terminology, this is called "heterogeneous system copy." Usually files have to be copied and a database export/import are required. This procedure usually induces business downtime. The shadow system process (e.g., process 200) described herein allows using the original, production system while the migration is done using the shadow system. The changes can afterwards be applied to the shadow system even if the system is running on a different operating system (OS) or database type (e.g., a procedure is required to transform the data set, in case there is anything operating system or database specific).

The subject matter described herein may also be used for system relocation. This is similar (or even the same) as the system migration to different hardware, operating system, or database type. Again, the relocation activities can be applied to the shadow system while the original, production system is used in production. Changes can be replayed, i.e., applied to the shadow system.

The subject matter described herein may also be used for service relocation. Service relocation procedure may be improved by some elements of the shadow system process described herein. If a configuration can be set to read only or recorded and the application data changes can be recorded, the changed data can be transported to the new service and replayed (e.g., applied) there, after which all requests can be re-directed to the new service.

The subject matter described herein can be implemented in a computing system that includes a backend component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other in a logical sense and typically interact through a communication network. The relationship of client and server arises by virtue of computer programs running on the respective computers and having a client-server relationship to each other.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product; i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed is:

1. A computer-readable storage medium containing instructions to configure a processor to perform operations comprising:
   creating a shadow system, the shadow system comprising an upgraded version of a production system comprising an application and data in a database;
   copying the at least one of the application and the database from the production system to the shadow system, the copying comprising migrating data of the at least one of the application and the database from the production system to the shadow system;
   providing, during the migrating, production system for continued productive use of the at least one of the application and the database, the continued productive use comprising receiving one or more changes to the data being migrated;
   recording, during the migrating, the one or more received changes to the data in a persistency container, at the production system;
   taking the production system out of productive use after completion of the migrating, the taking of the production system out of productive use comprising at least one of locking the production system to prevent further changes and taking the production system offline;
   replaying, after the production system has been taken out of productive use, the recorded one or more received changes from the persistency container to the shadow system, the replaying comprising executing the recorded one or more received changes in a sequential order of how the one or more received changes were received such that the data migrated to the shadow system from the production system are updated to reflect the one or more received changes; and
   initiating productive use at the shadow system to replace the production system after the production system is taken out of productive use.

2. The computer-readable storage medium of claim 1, wherein the operations further comprise: receiving an indication from a user to record the one or more received changes to the data in the production system in the persistency container instead of locking the production system during the migrating.

3. The computer-readable storage medium of claim 1, wherein recording further comprises: storing, in the persistency container, the one or more changes received to data at the production system, the recorded one or more received changes being configured to enable the one or more received changes to be applied to the data migrated to the shadow system.

4. The computer-readable storage medium of claim 1, wherein the migrating of the data from the production system to the shadow system further comprises: copying one or more of the following types of data: a sales order, a master data, account information, a customer invoice, a batch job runtime information, an update task information, an input queue, a print queue, a change log, and user data.

5. The computer-readable storage medium of claim 1, wherein the operations further comprise: deleting the recorded one or more received changes from the persistency container, when the recorded one or more received changes have been migrated from the persistency container to the shadow system.

6. A computer-readable storage medium as in claim 1, wherein the operations further comprise: creating, in the persistency container for each of one or more database tables comprising the data at the production system, a corresponding second database table, the second database table comprising a same key as its corresponding database table at the production system, a first key field defining a sequence number of one of the one or more received changes, and a second key field specifying a change kind of the one of the one or more received changes.

7. A computer-readable storage medium as in claim 1, wherein the operations further comprise: creating, in the persistency container, a single second database table, the single second database comprising, a table name of each of a plurality of database tables at the production system, a first key field defining a sequence number of one of the one or more received changes, and a second key field specifying a change kind of the one of the one or more received changes.

8. A computer-readable storage medium as in claim 1, wherein the operations further comprise: migrating one or more users attached to the production system to the shadow system.

9. A computer-readable storage medium as in claim 1, wherein the operations further comprise: also writing the received one or more changes to the production system as they are received.

10. A computer-readable storage medium as in claim 1, wherein the operations further comprise: recreating a previous state of the production system by using the one or more received changes recorded in the persistency container to roll back the one or more changes written to the production system during the migrating, the recreating being performed if a problem occurs during the migrating.

11. A computer-readable storage medium as in claim 1, wherein the upgraded version of a production system comprises a new format not used in a previous version of the production system, and wherein the operations further comprise recording the one or more received changes in the persistency container using the new format.

12. A computer-implemented method comprising:
   creating a shadow system, the shadow system comprising an upgraded version of a production system comprising an application and data in a database;

copying the at least one of the application and the database from the production system to the shadow system, the copying comprising migrating data of the at least one of the application and the database from the production system to the shadow system;

providing, during the migrating, the production system for continued productive use of the at least one of the application and the database, the continued productive use comprising receiving one or more changes to the data being migrated;

recording, during the migrating, the one or more received changes to the data in a persistency container at the production system;

taking the production system out of productive use after completion of the migrating, the taking of the production system out of productive use comprising at least one of locking the production system to prevent further changes and taking the production system offline;

replaying, after the production system has been taken out of productive use, the recorded one or more received changes from the persistency container to the shadow system, the replaying comprising executing the recorded one or more received changes in a sequential order of how the one or more received changes were received such that the data migrated to the shadow system from the production system are updated to reflect the one or more received changes; and initiating productive use at the shadow system to replace the production system after the production system is taken out of productive use.

13. The computer-implemented method of claim 12, further comprising: receiving an indication from a user to record the one or more received changes to the data in the production system in the persistency container instead of locking the production system during the migrating.

14. The computer-implemented method of claim 12, wherein recording further comprises: storing, in the persistency container, the one or more changes received to data at the production system, the recorded one or more received changes being configured to enable the one or more received changes to be applied to the data migrated to the shadow system.

15. The computer-implemented method of claim 12, wherein the migrating of the data from the production system to the shadow system further comprises: copying one or more of the following types of data: a sales order, a master data, account information, a customer invoice, a batch job runtime information, an update task information, an input queue, a print queue, a change log, and user data.

16. The computer-implemented method of claim 12, wherein the operations further comprise: deleting the recorded one or more received changes from the persistency container, when the recorded one or more received changes have been migrated from the persistency container to the shadow system.

17. A system comprising:

a processor; and a memory, wherein the processor and the memory are configured to perform a method comprising:

creating a shadow system, the shadow system comprising an upgraded version of a production system comprising an application and data in a database;

copying the at least one of the application and the database from the production system to the shadow system, the copying comprising migrating data of the at least one of the application and the database from the production system to the shadow system;

providing, during the migrating, the production system for continued productive use of the at least one of the application and the database, the continued productive use comprising receiving one or more changes to the data being migrated;

recording, during the migrating, the one or more received changes to the data in a persistency container at the production system;

taking the production system out of productive use after completion of the migrating, the taking of the production system out of productive use comprising at least one of locking the production system to prevent further changes and taking the production system offline;

replaying, after the production system has been taken out of productive use, the recorded one or more received changes from the persistency container to the shadow system, the replaying comprising executing the recorded one or more received changes in a sequential order of how the one or more received changes were received such that the data migrated to the shadow system from the production system are updated to reflect the one or more received changes; and initiating productive use at the shadow system to replace the production system after the production system is taken out of productive use.

18. The system of claim 17, wherein the operations further comprise: receiving an indication from a user to record the one or more received changes to the data in the production system in the persistency container instead of locking the production system during the migrating.

* * * * *